UNITED STATES PATENT OFFICE.

LAUNCELOT W. ANDREWS, OF DAVENPORT, IOWA.

METHOD OF PRODUCING OXALATES.

1,018,092.  Specification of Letters Patent.  Patented Feb. 20, 1912.

No Drawing.  Application filed August 10, 1910.  Serial No. 576,594.

*To all whom it may concern:*

Be it known that I, LAUNCELOT W. ANDREWS, a citizen of the United States, residing at Davenport, in the county of Scott and State of Iowa, have invented certain new and useful Improvements in Methods of Producing Oxalates and Oxalic Acid, of which the following is a specification.

This invention relates to an improved method of producing oxalates and oxalic acid.

The present invention has for its object the provision of a method whereby a product is obtained which is superior to the products obtained by the methods now known to the prior art and which can be practiced more economically than the methods now known to the prior art.

In carrying out the present process or method, saw dust or other material containing compounds belonging to the class of carbohydrates is mixed with a suitable proportion of caustic alkali and sufficient water added thereto to completely moisten the whole mass. This mixture of saw dust or other material, caustic alkali and water is then introduced into and submerged in a bath of petroleum, or any other oil or oils of a high boiling point and of such character as not to be materially acted upon by any of the substances of the mixture introduced therein and previously heated to a temperature of about 135° C. After the saw dust and caustic alkali have been introduced into the oil, the temperature thereof is gradually raised as the steam escapes therefrom and the mixture is constantly stirred. The oil is brought to a final temperature which varies from 200° C. to 320° C., according to the character of the particular carbohydrate which is employed as a raw material. The passage of the escaping steam through the bath serves in a measure to stir the same and hence mechanical stirring may be dispensed with, if desired. This treatment is continued until the product has been formed, which will probably require about eight hours and then the oil is separated from the solid product, preferably by the use of a centrifugal machine, and the oil may be then employed again. The solid product which is obtained from this separation consists of crude alkali oxalate, from which the oxalic acid may be obtained by any of the processes known to the art.

In the centrifugal machine all the oil is separated from the solid matter except 1 to 3 per cent. which remains in the crude oxalate. When the latter is dissolved in hot water, the remaining oil, contaminated with brownish decomposition products, rises to the top. It may then be skimmed off and after filtration used again. It therefore has no effect on the subsequent crystallization. The method of crystallization referred to, is that known to the present art and may be briefly described as follows:—The crude alkali oxalate, as it comes from the heating process, is boiled with milk of lime, either immediately or after a preliminary re-crystallization. The precipitated calcium oxalate is washed with hot water after filtration, then boiled with an excess of dilute sulfuric acid and filtered from the calcium sulfate. The filtrate is concentrated in lead lined vessels and set aside to crystallize. The liquor filtered from the calcium oxalate is concentrated by filtering, to recover the alkali.

Regarding the chemical reactions involved, in the present process, it must be said that the intermediate steps are probably many and complicated, and hence it is only possible to give the beginning and the end members of the chemical changes. On the face of it the conversion of "cellulose" ($C_6H_{10}O_5$) into oxalic acid $H_2C_2O_4$ is a reaction of oxidation, and it might be thought that the reaction would be expressed by the equation

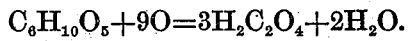

$$C_6H_{10}O_5 + 9O = 3H_2C_2O_4 + 2H_2O.$$

This is however, incorrect. I have demonstrated first, that if oxygen be absolutely excluded, the amount of oxalic acid formed is not reduced; second, that during the reaction enormous quantities of hydrogen are liberated. The actual reaction is approximately expressed by the following equation:—

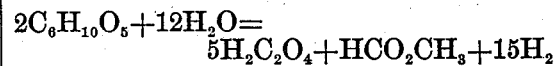

$$2C_6H_{10}O_5 + 12H_2O = 5H_2C_2O_4 + HCO_2CH_3 + 15H_2$$

at higher temperatures, or by

$$C_6H_{10}O_5 + 5H_2O = 2H_2C_2O_4 + HCO_2CH_3 + 6H_2$$

at lower temperatures. It is therefore apparent that the reaction is essentially one of hydrolysis. The function of the alkali is twofold. First, by its affinity for water, it retains the latter, and releases it only at a very high temperature, namely at the temperature requisite for the above reaction. Second, it imparts to the oxalic acid the stability needed to resist decomposition at the temperature of formation.

The total immersion of the mixture of saw dust or other raw material and caustic alkali in the heated oil insures an even heating of the entire mass of the mixture to exactly the desired temperature and removes all danger of overheating. By the present method also it will be apparent that it is possible to handle large quantities in a single apparatus at one time, with economy of space and labor, and since the oil excludes air from the mixture it will be seen that the method possesses all of the advantages of the vacuum process, namely, increased yield and better color of the crude product, and can at the same time be carried out much more economically than any of the vacuum processes known to the prior art.

The product obtained by the present process is of such color and purity that it is possible to obtain from it oxalic acid of commercial grade in one crystallization, whereas two or three are required in the commercial processes as ordinarily practiced. Also by virtue of the improved color and purity of the product obtained by the present process, it is possible to recover the alkalis from the liquors in a state pure enough to use again without the necessity of separating it in the solid form and igniting it, as must be done in the ordinary processes.

I claim:

1. A process for producing oxalates consisting in mixing a carbohydrate material with caustic alkali and water, and immersing the mixture in a bath of heated oil.

2. A process for producing oxalates by the action of hot caustic alkali on oxalic acid forming material consisting in the immersion of the reacting mass during the period of the reaction, under the surface of a liquid non-reactive organic substance.

3. A process for producing oxalates consisting in mixing caustic alkali and an oxalic acid forming material, immersing the mixture in a bath of non-reacting oil, heating the bath of oil, and finally separating the oil from the solid product.

4. A process for producing oxalates consisting in mixing saw dust with hot caustic alkali, immersing the mixture in a bath of petroleum, heating the petroleum, and finally separating the oil from the solid product.

In testimony whereof I affix my signature in presence of two witnesses.

LAUNCELOT W. ANDREWS.

Witnesses:
SOPHIA W. OLMSTED,
JOHN C. OLMSTED.